United States Patent [19]

Graham et al.

[11] Patent Number: 4,949,580
[45] Date of Patent: Aug. 21, 1990

[54] AUDIO ANALYSIS SYSTEM

[76] Inventors: John F. Graham, 1191 Calle Arroyo, Thousand Oaks, Calif. 91360; Donald N. McLaughlin, 22757 Plummer, Chatsworth, Calif. 91311

[21] Appl. No.: 359,222

[22] Filed: May 31, 1989

[51] Int. Cl.$^5$ .............................................. G01H 17/00
[52] U.S. Cl. ..................................................... 73/646
[58] Field of Search ................. 73/645, 646, 647, 648; 324/77 B, 77 E, 77 F; 364/485; 381/56

[56] References Cited

U.S. PATENT DOCUMENTS

| 3,747,703 | 7/1973 | Knowd et al. | 73/648 |
| 3,848,471 | 11/1974 | Hamburg et al. | 73/647 |
| 4,277,980 | 7/1981 | Coats et al. | 73/646 |
| 4,307,385 | 12/1981 | Evans et al. | 73/647 |
| 4,380,732 | 4/1983 | Tanaka et al. | 324/77 E |
| 4,640,134 | 2/1987 | Simmons | 324/77 E |

Primary Examiner—Hezron E. Williams
Assistant Examiner—Louis M. Arana
Attorney, Agent, or Firm—Poms, Smith, Lande & Rose

[57] ABSTRACT

An audio analysis system visually displays a variance of sound intensity in each of several discreet frequency bands from the average sound intensity across all frequency bands. The audible sound is detected and converted to a first electrical signal which represents the ambient sound detected. A second electrical signal is developed as a function as the average DC level of the first signal. The DC level of the first signal is then shifted in accordance with the average level of the second signal to develop a level shifted signal. The level shifted signal is then graphically displayed in the discrete frequency bands so that the plus or minus deviation from the average level signal is displayed in each of those bands. The display may be provided with a visual representation, such as a graphic overlay or multicolor display, showing the probability of risk to hearing loss produced in each of those bands.

40 Claims, 5 Drawing Sheets

AUDIO ANALYSIS SYSTEM

FIELD OF THE INVENTION

The present invention relates generally to audio spectrum analysis and more particularly to a novel apparatus which measures audio sound and pressure levels and graphically displays such levels in discrete frequency bands wherein the level in each frequency band is centered about an overall average level.

BACKGROUND OF THE INVENTION

In 1975 and 1976, an audio metric survey of the membership of the Audio Engineering Society (AES) suggested that some of the members are at risk for hearing loss due to the high intensity sound exposure in their employment and positions that require critical listening to sounds, frequently at high intensity levels. In 1986, a follow-up audiometric survey was conducted to reassess the hearing level of the AES members. The results of the follow-up survey are reported in "Results of the 1986 AES Audiometric Survey," *Journal of The Audio Engineering Society*, Vol. 36, No. 9, September 1988, pp. 686-691. So that the more casual reader may obtain a full appreciation of the environment in which the hereinbelow described present invention has been conceived, the results of the 1986 audiometric survey are summarized with reference to FIGS. 1-4.

The term "Noise Induced Hearing Loss" (NIHL) is used to refer to the general category of hearing loss produced by exposure to excessively intense sounds. Such a hearing loss can have a sudden onset as the result of a single exposure to an extremely intense sound, such as an explosion, or it can be of an insidious nature as the result of exposure to relatively low intensity sounds over a prolonged period of time.

With particular reference to FIG. 1, the loss of hearing due to high intensity or prolonged sound exposure is the result of physiological, biochemical or anatomic changes within an ear 1. Generally, the ear 1 receives ambient sound pressure waves which propagates through the ear canal 3 causing vibrating movement of the eardrum 5. The vibrating movement of the eardrum 5 is transferred to the anvil 7. The sound waves detected by the drum 5 are transferred to the cochlea 9 by the anvil 7 which induces pressure waves in the fluid filled cochlea 9. The pressure waves are transduced to electric impulses that the nervous system interprets as sound. Damage to the structures within the cochlea 9, particularly damage to the hair cells, impair the nervous system'ability to transduce the acoustic pressure waves. Hair cells that have been destroyed by noise, age, disease nor drugs are not regenerated or replaced by other cells.

Impairment to hearing may present itself as a reduced ability to discriminate between frequency or to encode rapidly changing frequency/intensity information in a signal, or as a need for greater intensity for the detection of an acoustic signal. The last of these impairment effects is an elevated auditory (hearing) threshold which is the measure used to describe hearing loss, including losses due to noise exposure. As best seen in FIG. 2, there are shown damage risk contours graphically illustrating probabilities of ear damage occurring from noise induced hearing loss. The damage risk contours are plotted against a log of frequency along the abscissa. The left hand ordinate relates to one exposure per day to full octave bands of noise. The right hand ordinate relates to ⅓ octave or narrower bands of noise. It is to be noted that damage occurs most readily in the NIHL zone of 3,000 to 6,000 Hz and at relatively low decibel levels of sound.

With further reference to FIG. 3, the loss of hearing as a result of high intensity sound exposure is again shown to occur in the NIHL frequency range. This frequency region often is the one initially affected, regardless of the sound spectral content. The susceptibility to damage of the sensory hair cells in the 3,000 to 6,000 Hz. region appears to be the result of two primary factors.

The first factor is that the hair cells responsible for the transduction of sounds in this frequency range are located in the region of the first turn of the 3¼ turn cochlea 9. Given that location, these cells are subjected to the greatest amount of stress due to shear forces caused by the travelling sound wave within the fluid filled cochlea 9. This travelling sound wave 11 is diagrammatically represented travelling through the schematic representation of the cochlea 9 in FIG. 3.

The second factor is that the ear canal 3 acts as a tube resonator and as such provides approximately 10-17 dB of gain within the frequency band of 3,000 to 5,000 Hz. The ear canal resonance (ECR) zone is shown in FIGS. 2 and 3. Also illustrated in FIG. 3 is the 3,000 to 6,000 Hz. noise induced hearing loss (NIHL) range. Although the initial noise induced hearing loss is used within the 3,000 to 6,000 Hz. region, an even broader frequency range becomes involved as the duration of the exposure to high intensity sound increases. A typical plot of audiometric threshold vs. frequency is shown in FIG. 4 which illustrates hearing loss as a result of ECR and NIHL for a thirty year old man who had been subject to substantial levels of sound over prolong periods.

In contrast to hearing loss that is a result of noise exposure, hearing loss associated with the aging process begins with high frequencies (above 4,000 Hz), so that the ear acts much like a low pass filter. As a person ages, the hearing loss spreads to include lower frequencies. However, these two sources of hearing loss are not mutually exclusive, and the combined effects of high intensity sound exposure and aging can result in a severely disabling hearing loss.

Generally, hearing impairment often goes unnoticed because hearing threshold in the predominant speech frequencies below 3,000 Hz are initially unaffected. Significant reductions in hearing can occur at or above 4,000 Hz without resulting in an obvious awareness of hearing change, so that years of noise exposure damage may elapse before a loss of hearing may be subjectively apparent. According to the National Institute of Occupational Safety and Health, impairment exists when the ability to understand speech under everyday conditions is reduced. Thus, impairment begins where the average threshold level at 1,000, 2,000 and 3,000 Hz for both ears exceed 25 dB.

As best seen in FIG. 3, the threshold of hearing is lowest in the range between approximately 800 Hz and 10 kHz. The damage risk contours of FIG. 2 show that the most damage occurs in the narrow ECR zone and NIHL zone. However, since these zones are above the normal conversational frequency levels, the detection of hearing loss of course goes unnoticed. Although early detection of hearing loss at 4000 Hz should alert an individual to the potential of further hearing loss, such detection is often not taken. Therefore, it is desireable to encourage the taking of precautions in order to minimize the contribution to hearing loss. A great need exists for an instrument which displays spectral content of ambient sound with particular emphasis on the ECR and NIHL zones, and which displays the spectral content in a way which indicates the risk to hearing loss of the intensity of sound in each spectral region. The desirability of such a device is further enhanced by the requirements imposed by both state and federal governments for noise abatement and control.

For example, 42 U.S.C. §4901, et.seq., provides for identification of major noise sources, noise emission standards for products distributed in commerce and enforcement by penalizing for prohibited acts either by criminal or civil penalties. These noise control standards not only control the overall sound intensity but may have standards directed to the frequency spectrum and duration of the sound. In the Revised Code of Washington, §70.107.010, et. seq., such standards directed to the frequency spectrum are authorized to be adopted by local authorities. Specifically, local authorities are particularly authorized to adopt standards regulating, as to time and place, the operation of individual products which produce noise above specified levels considering frequency spectrum and duration (RCW §70.107.030(b)).

DESCRIPTION OF THE PRIOR ART

A typical spectrum analyzer will display the frequency spectrum of sound being emitted from an audio system, and is useful for balancing or equalizing room acoustics in each of the frequency bands. Since a typical room with furniture does not exhibit good acoustics, the equalizer will adjust the intensity found in each of the frequency bands to compensate for attenuation of sound in those frequency bands. For example, the SEA-66 stereographic equalizer commercially available from JVC Company of America, when used in an audio system, emits a "pink" noise which is a noise with equal energy at all frequencies, and play such noise through the system speakers. A calibrated microphone is then placed in the room. When equalizer controls are centered, the overall response of the system in the room will be displayed on a spectrum analyzer. The equalizer frequency controls may be moved up or down to smooth the overall response to obtain an optimum flat response across all frequency bands.

However, a disadvantage and limitation of the prior art spectrum analyzer is that the spectrum analysis of sound which is displayed is not shown about an average intensity sound level wherein the average intensity sound level is also changing. Thus, the prior art spectrum analyzer is only useful to equalize sound in a closed room environment across all frequency bands. As described hereinabove, it is desirable to be able to monitor sound in the ECR and NIHL zones to minimize sound levels in these zones wherein the greatest risk to hearing loss occurs. Accordingly, another disadvantage and limitation of the prior art is that such prior art spectrum analyzers do not indicate when the level of sound in each band falls within a danger risk area.

SUMMARY OF THE INVENTION

It is therefore an object of the present invention to provide a novel device which is designed to measure the intensity of acoustic sound level and to be particularly graphic in the area of sound spectrum where the ear is more sensitive to damage.

According to the present invention, an audio analysis system visually displays a variance of sound intensity in each of several discrete frequency bands from the average sound intensity across all frequency bands. The audible sound is detected and converted to a first electrical signal which represents the ambient sound detected. A second electrical signal is developed as a function of the average DC level of the first signal. The DC level of the first signal is then shifted in accordance with the average level of the second signal to develop a level shifted signal. The level shifted signal is then graphically displayed in the discrete frequency bands so that the plus or minus deviation from the average level signal is displayed in each of those bands.

A feature of the present invention is that the display may be provided with a visual representation such as a graphic overlay or multicolor display showing the probability of risk to hearing loss produced in each of those frequency bands.

These and other objects, advantages and features of the present invention will become readily apparent to those skilled in the art from a study of the followings description of an exemplary preferred embodiment when read in conjunction with the attached drawings and appended claims.

DESCRIPTION OF AN EXEMPLARY PREFERRED EMBODIMENT

Figure 5:
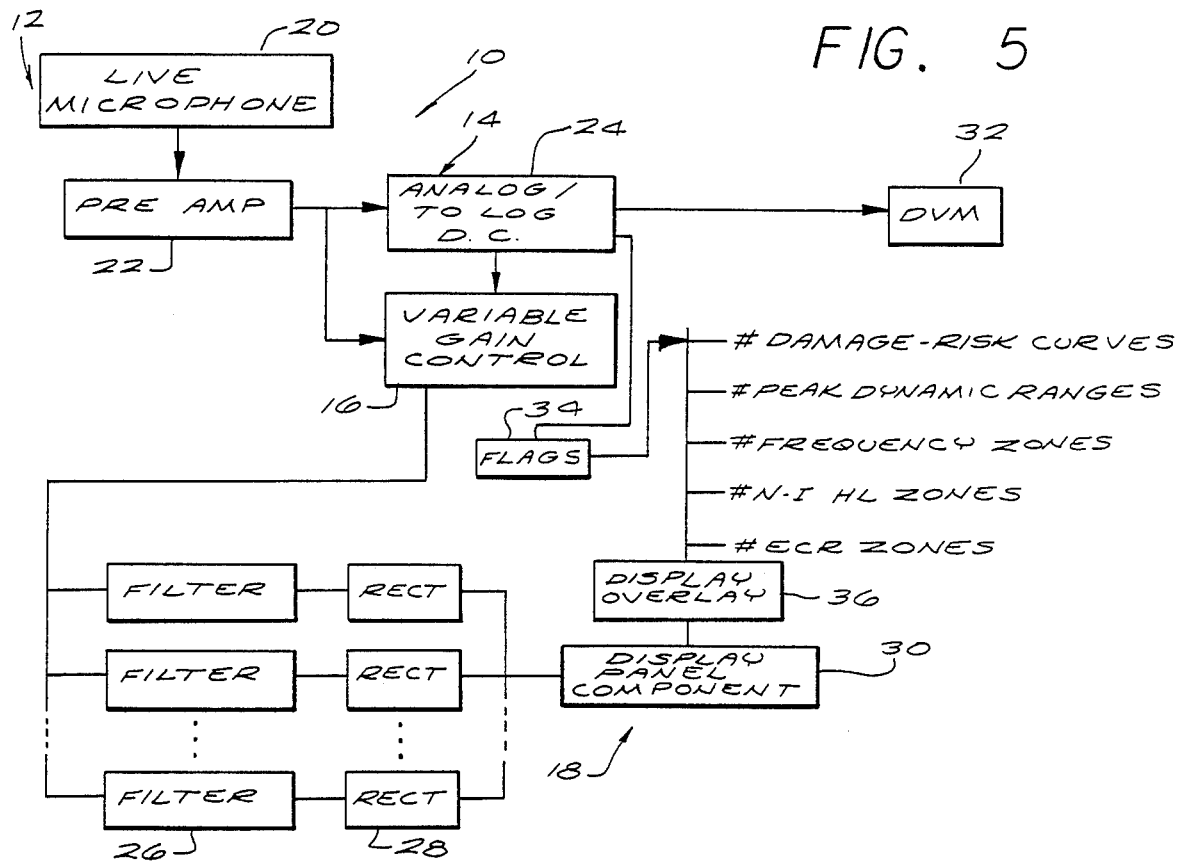
FIG. 5 is a schematic block diagram of an audio analysis system constructed according to the principles of the present invention.

Referring now to FIG. 5, there is shown an audio analysis system 10 constructed according to the principles of the present invention. The audio analysis system 10 includes means 12 for detecting audible sound and converting the sound into a first electrical signal; means 14 responsive to the first electrical signal for developing a second electrical signal as a function of an average level of the first signal; means 16 responsive to each of the first electrical signal and the second electrical signal for varying the DC level of the first signal commensurately with the second signal to develop a level shifted signal, and means 18 for visually displaying the variance of the level shifted signal from the second signal in a plurality of discrete frequency bands.

Detecting means 12 includes a microphone 20 and a preamplifier 22. The preamplifier 22 is operatively coupled to the microphone 20, the preamplifier developing the above-described first electrical signal. In one embodiment of the present invention, the microphone 20 may be a 130 dB omnidirectional microphone. In one embodiment of the present invention, the developing means 14 develops the second signal as a log DC function of the analog first electrical signal. Accordingly, the developing means 14 may include an analog-to-log DC converter, the details which will be described more fully hereinbelow. The analog first electrical signal and the second electrical signal which represents the log DC level of the first electrical signal each applied to the varying means 16. Varying means 16, as will become more apparent from the description hereinbelow, shifts the DC level of the first signal in an amount substantially equal and opposite to the DC level of the log DC signal.

The displaying means 18 includes a plurality of bandpass filters 26. Each of the bandpass filters have the level shifted signal applied thereto. Each one of the bandpass filters corresponds to one of the discrete frequency bands in which the variance of the level shifted signal from the log DC signal is displayed. Accordingly, each of the bandpass filters 26 develops a filtered signal having an amplitude corresponding to the intensity of the level shifted signal and the frequency band represented by each of the bandpass filters. As will be described in greater detail hereinbelow, the filtered signal from each of the bandpass filters 26 is applied to a rectifier 28. The rectified filtered signal is applied to the display panel component 30 which displays the variance. The number of frequency bands and the respective bandwidth of each band is selected in accordance with the intended environment in which the audio analysis system 10 is to be used.

The audio analysis system 10 of the present invention further includes means 32 for visually displaying in numeric characters an average level of the second electrical signal. The developing means 14 further develops a third signal to which the numeric characters displaying means 32 is responsive. In one embodiment of the present invention, the numeric character displaying means 32 may be a digital volt meter. The specific embodiment of the numeric character displaying means 32 is described in greater detail hereinbelow. Furthermore, the developing means 14 also developed a fourth signal, for similar information of the third signal applied to the numeric character generating means 32, for application to a flag display 34. The flag display 34, as will be described in greater detail hereinbelow, indicates when the overall level of the third signal, which is derived from the log DC signal indicates certain indicators such as ear canal resonance (ECR) zones, noise induced hearing loss (NIHL) zones, other frequency zones, peak dynamic ranges and damage risk sectors. These flags may be incorporated into a display overlay 36.

Figure 7A:
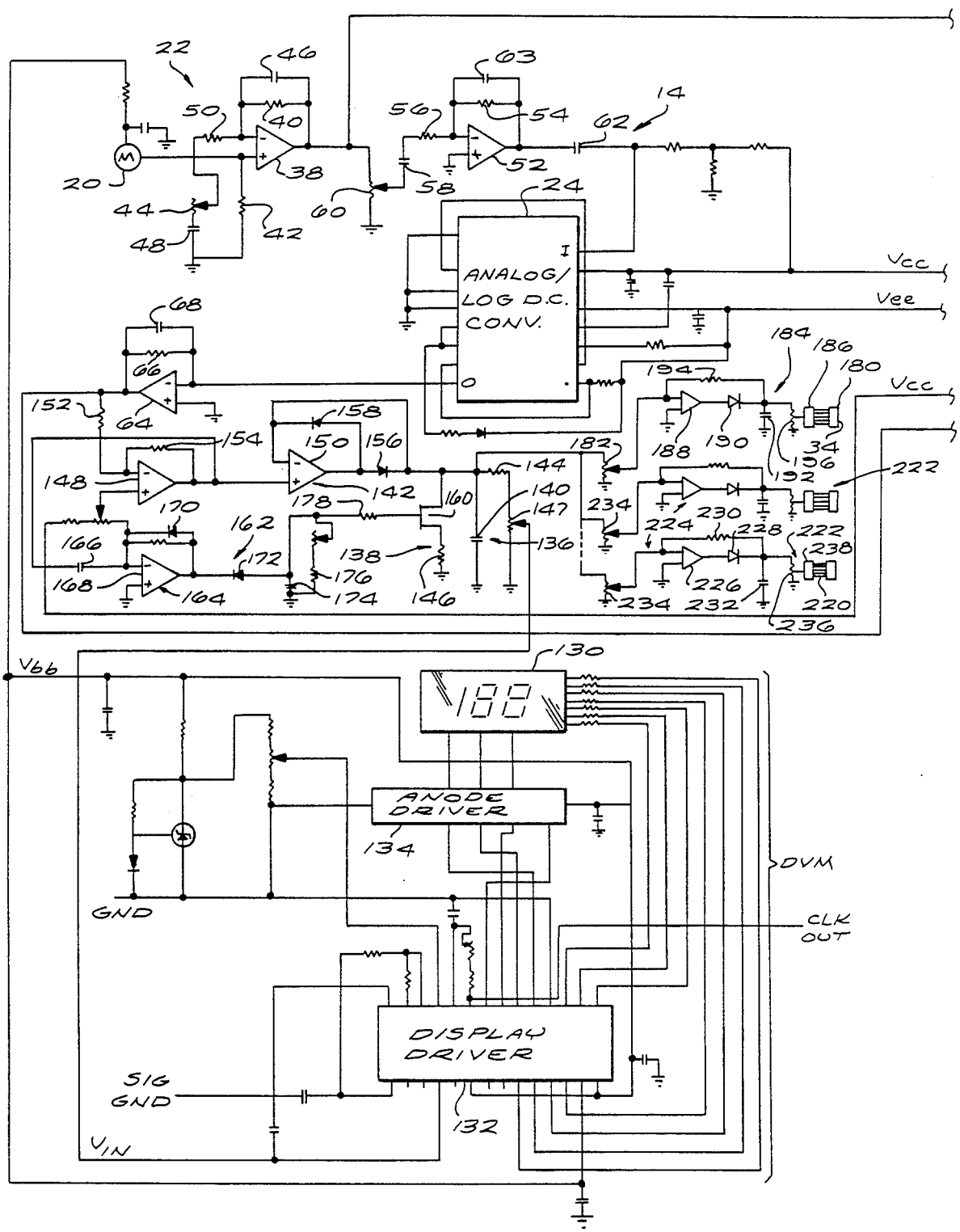
FIG. 7A and 7B is a circuit diagram of the audio analysis system of FIG. 5.

With further reference to FIG. 7A, the preamplifier 22 includes an operational amplifier 38, a first feedback resistor 40, a second feedback resistor 42 and a variable input calibration resistor 44. The operational amplifier 38 has an inverting (−) input, a noninverting (+) input and an output. The first feedback resistor 40 is coupled between the inverting input and the output of the operational amplifier 38. The second feedback resistor is coupled between the noninverting input of the amplifier 38 and ground potential. Input calibration resistor 44 is resistively coupled between the inverting input of the amplifier 38 and capacitively coupled to ground potential. In one embodiment of the present invention, the resistance of each of the first feedback resistor and second feedback resistor are substantially equivalent. The preamplifier 22 may also include a first capacitor 46 and a second capacitor 48. The first capacitor is coupled between the inverting input and the output of the operational amplifier 38. The second capacitor 48 provides a capacitive coupling between the input calibration resistor 44 and ground potential. A resistor 50 may be provided to resistively couple the input calibration resistor 44 to the inverting input of the operational amplifier 38.

Figure 1:
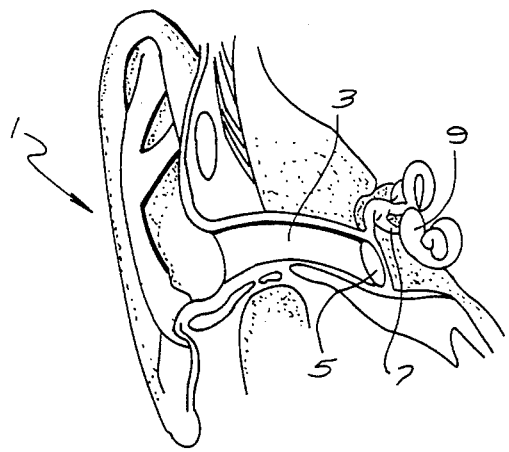
FIG. 1 is a representation of a human ear.
Figure 3:
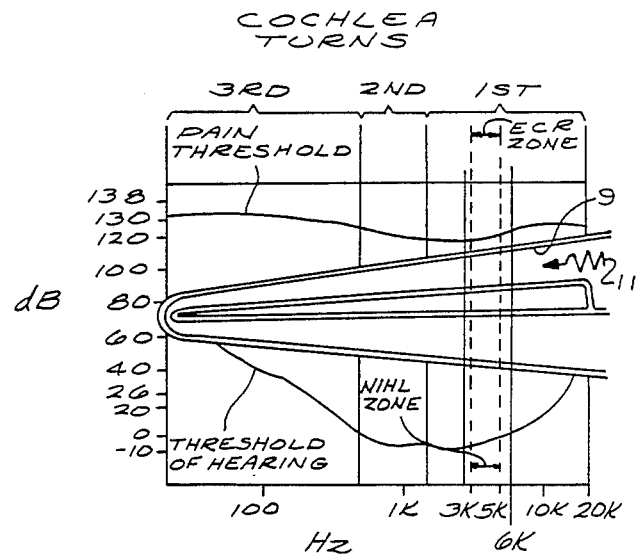
FIG. 3 is a graphical representation of areas of greatest damage to the cochlea resulting in hearing loss.
Figure 2:
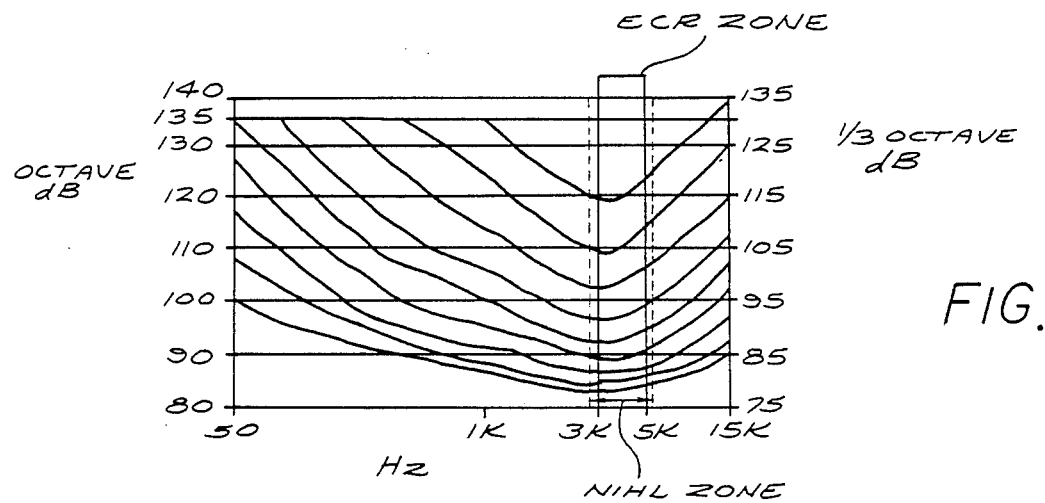
FIG. 2 graphically illustrates risk/damage contours of possible damage occurring to the ear as a function of frequency.
Figure 4:
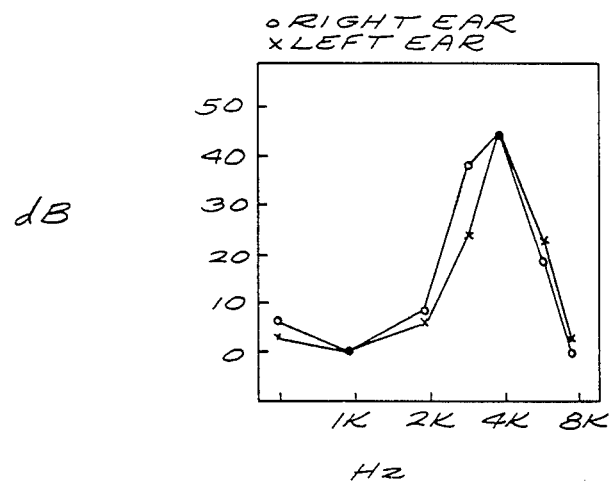
FIG. 4 is a graphical representation of hearing threshold of the ear as a function of frequency.

The analog-to-DC converter 24, schematically shown in FIG. 1, includes at least one signal input (−) adapted for application of the first signal thereto and a signal output (O) at which a log DC signal is developed. As best seen in FIG. 7A, developing means 14 further includes an amplifier 52, a feedback resistor 54 and an input resistor 56. The amplifier 52 has an inverting (−) input, a noninverting (+) input and an output. The noninverting input of the amplifier 52 is coupled to ground potential, and the output thereof is adapted for applying the first signal to the signal input (I) of the analog/log DC converter 24. The feedback resistor 54 is electrically coupled between the inverting input and the output of the amplifier 52. The input resistor 56 is coupled to the inverting input of the amplifier 52 and is adapted for application of the first signal developed by the preamplifier 22 thereto.

To couple the first signal developed by the preamplifier 22 to the amplifier 52, the developing means 14 further includes a DC blocking capacitor 58 and a variable resistor 60. The first signal developed by the preamplifier 22 is applied to the variable resistor 60. The DC blocking capacitor 58 is coupled between the variable resistor 60 and the input resistor 56 of the amplifier 52. It should be noted that the amplifier 52 inverts the polarity of the first electrical signal. To apply the inverted first electrical signal to the signal input (I) of the analog/log DC converter 24, another DC blocking capacitor 62 is coupled between the output of amplifier 52 and the signal input (I). A feedback capacitor 63 may also be provided between the inverting input and the output of the amplifier 52.

To apply the log DC signal to the varying means 16, the developing means 14 further includes a DC driver amplifier 64, a feedback resistor 66 and a feedback capacitor 68. The DC driver and amplifier has an inverting (−) input to which the log DC signal is directly applied, a noninverting (+) coupled to ground potential, and an output for applying the log DC signal to the varying means 16. The feedback resistor 66 is coupled between the inverting input and the output of the DC driver amplifier 64. Similarly, the feedback capacitor 68 is coupled in parallel to the feedback resistor 66. It is to be noted that the DC driver amplifier again inverts the signal developed at the signal output of the analog/log DC converter 24. However, since the signal has already been of a reverse polarity because of the conversion at the amplifier 52, the log DC signal now has proper polarity at the output of DC driver amplifier 64. In one embodiment of the present invention, the analog/log DC converter 24 may be a commercially available SSM 2110 converter.

Figure 7B:
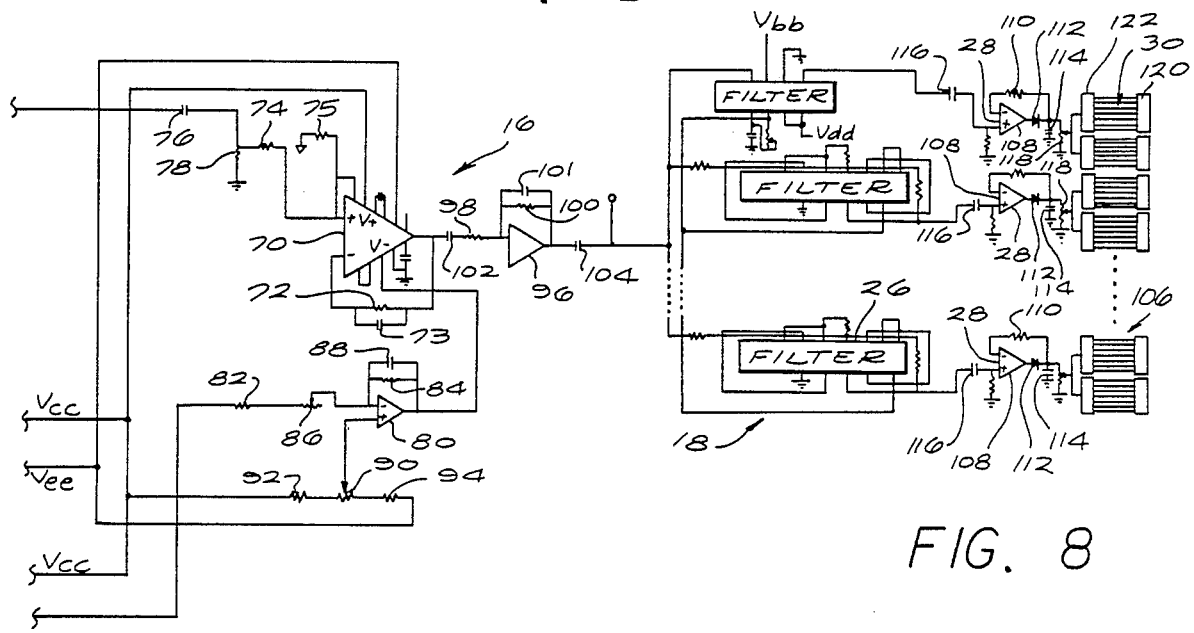

With further reference to FIG. 7B, the varying means 16 includes a voltage controlled amplifier 70 having an inverting (−) input, a noninverting (+) input, an output, a first bias voltage input (V+) and a second bias voltage (V−) input. The first bias voltage input is coupled to a first bias potential $V_{cc}$. The second bias voltage (V−) input is adapted for application of the second electrical signal thereto. The output of the variable gain control amplifier 70 develops the level shifted signal. A feedback resistor 72 and capacitor 73 are electrically coupled between the inverting input and the output of the voltage controlled amplifier 70. A first input resistor 74 is electrically coupled to the noninverting input of the voltage control amplifier 70 and is adapted for application of the first electrical signal developed by the preamplifier 22 of detecting means 12 thereto. A bias resistor 75 is coupled between the non-inverting input and ground potential.

To couple the first electrical signal to the voltage control amplifier 70, varying means 16 further includes a DC blocking capacitor 76 to which the first electrical signal is applied and a variable resistor 78 electrically coupled between the DC blocking capacitor 76 and the input resistor 74. The variable resistor 78 is adjusted to provide for proper signal level applied to voltage controlled amplifer 70.

To couple the second electrical signal developed by developing means 14 to the second bias potential input (V−), varying means 16 further includes an amplifier 80. The amplifier 80 has an inverting (−) input, a noninverting (+) input and an output electrically coupled to the second bias voltage input (V−) of the voltage controlled amplifier 70. Varying means 16 further includes an input resistor 82 to which the second signal is applied. The inverting input of the amplifier 80 is adapted for being coupled to the input resistor 82. Developing means 16 further includes a feedback resistor 84 coupled between each of the inverting input and the output of the amplifier 80.

To couple the input resistor 82 to the inverting input of the amplifier 80, varying means 16 further includes a variable resistor 86 coupled therebetween. The variable resistor 86 is adjustable for tracking of the second electrical signal and adjusting the gain characteristics of the voltage controlled amplifier 70. To prevent unwanted oscillations of amplifier 80, a feedback capacitor 88 may be coupled between the inverting input and output of amplifier 80.

The gain of the voltage controlled amplifier 70 is adjustable by adjusting the gain of the amplifier 80 to which the log DC signal is applied. Accordingly, varying means 16 further includes a potentiometer 90 having a first terminal adapted for coupling to the first bias potential, $V_{cc}$, a second potential adapted for coupling to a third bias potential, $V_{ee}$, and a third terminal at which said second bias potential is developed. The third terminal of the potentiometer 90 is electrically coupled to the noninverting input of the amplifier 80. Varying means 16 further includes a first voltage divider resistor 92 electrically coupled between the first bias potential, $V_{cc}$, and the first terminal of the potentiometer 90, and a second voltage divider resistor 94 electrically coupled between the second terminal potentiometer 90 and the third bias potential, $V_{ee}$. The first voltage divider resistor 92 and the second voltage divider resistor 94 have substantially identical resistance. Therefore, it is clearly seen that by adjusting the potentiometer 90, the output signal of the amplifier 80 accordingly varies the gain of the voltage controlled amplifier 70.

To couple the level shifted signal developed by varying means 16, and more particularly the voltage controlled amplifier 70, to the displaying means 18, the varying means 16 further includes an output amplifier 96 having an inverting (−) input, a noninverting (+) input coupled to ground and an output adapted for applying the level shifted signal to the displaying means 18. Varying means 16 further includes an input resistor 98 coupled to an input of the output amplifier 66. The input resistor 98 is adapted for application of the level shifted signal thereto. Varying means 16 further includes a feedback resistor 100 and a feedback capacitor 101 coupled between the inverting input and the output of the output amplifier 96.

To couple the level shifted signal to the input resistor 98, varying means 16 also includes a DC blocking capacitor electrically coupled between the output of the voltage controlled amplifier 70 and the input resistor 98. A second DC blocking capacitor 104 couples the output of the output amplifier 96 to apply the level shifted signal to the displaying means 18.

Figure 12:
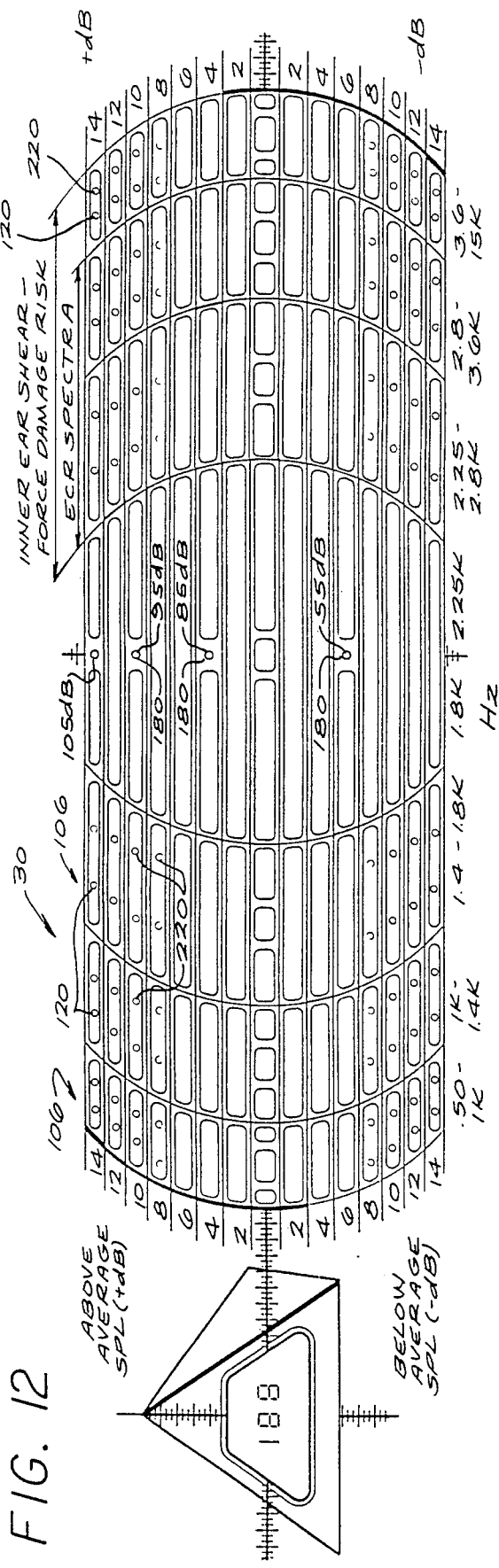
FIG. 12 is a schematic representation of a bar graph display with discrete frequency bands centered about the average frequency for the embodiment of the invention shown in FIG. 5.

As described hereinabove, the displaying means 18 includes the bandpass filters 26, rectifiers 28 and display panel component 30. With further reference to FIG. 12, the display panel component 30 includes a plurality of LED bar graphs 106. Each of the bar graphs 106 is associated with one of the filters 26 for application of the filtered signal thereto. Each of the bar graphs visually represents an amplitude of the filtered signal applied thereto and the variance from the third signal developed by developing means 14 and applied to the numeric character generating means 32.

Each of the rectifiers 28 includes an amplifier 108, each of the amplifiers 108 has an inverting (−) input, a noninverting (+) input and an output. The noninverting input of each amplifier 108 is adapated for application of the filtered signal from an associated one of the filters 26. A bias resistor 110 is coupled to the noninverting input of the amplifier 108 and ground potential. A feedback resistor is coupled between the inverting input of the amplifier 108 and its output. To rectify the filtered signal, each rectifier 28 includes a diode 112 and a capacitor 114. Each diode 112 has an anode electrically coupled to the output of the rectifier amplifier 108 associated therewith and a cathode adapted for coupling an associated one of the display components 30. The feedback resistor 110 is further coupled to the cathode of the diode 112. To smooth the recitified signal, the rectifier further includes a capacitor 114 electrically coupled between the cathode of each diode 112 associated therewith and ground potential.

Each rectifier 28 is DC isolated from the filter 26 associated therewith. Accordingly, displaying means 18 further includes a DC blocking capacitor 116 electrically coupled between the noninverting input of the rectifying amplifier 108 and the associated filter 26. So that a full display on the display component 30 is achieved, displaying means 18 also includes a variable resistor 118 coupled between the cathode of the diode 112 and the display component 30 for application of each filtered and rectified signal to the associated one of the display component 30.

With further reference to FIG. 12, each of the LED bar graphs 106 includes a plurality of LEDs 120 and an LED driver 122 to which said filtered signal through the variable resistor 18 is applied. The LED driver 122 applies a current to selected ones of the LED within each bar graph display 106 as a function of the amplitude of the filtered signal applied thereto. In one embodiment of the present invention, each bar or diode 120 of each bar graph 106 represents a 2 dB change in amplitude of the filtered signal. Each LED driver 122 may, in one embodiment of the present invention, be a commercially available LM3914 LED driver.

Returning to FIG. 7A, the numerical character displaying means 32 includes an LED numeric display 130, a display driver 132 and an anode 134. The LED display 130 has a databus input electrically coupled to a databus output of the display driver. The LED display 130 further has an anode driver input coupled to a driver output of the anode driver 134. A controlled output of the display driver is coupled to a controlled input of the anode driver. Finally, the display driver has an input to which the third signal, hereinabove described is applied.

To develop this third signal, developing means 14 further includes sample and hold means 136 for storing for a selected time duration a peak voltage of the second signal developed by amplifier 64. The third signal is the peak voltage of the second signal and decays during the selected time duration. Developing means 14 further includes means 138 for switching the selected time duration to a relatively longer time duration in response to large amplitude changes of the second signal.

Sample and hold means 136 includes a storage capacitor 140 having a first plate coupled to ground and a second plate, means 142 for coupling the second signal to the second plate of the capacitor 140 to charge the capacitor to develop the third signal, a first resistor 144 and a second resistor 146. The first resistor 144 is electrically coupled through a potentiometer 147 to ground potential and the second plate of capacitor 140. The second resistor 146 is effectively electrically coupled between the second plate of capacitor 140 (through a normally on transistor which will be described below) and ground potential. The selected time duration is then determined by the effective parallel resistance of the first resistor 144 and second resistor 146. The third signal is coupled to the display driver 132 through the potentiometer 147.

The coupling means 142 includes a DC driver amplifier 148 and a curve shaper amplifer 150. The DC driver amplifier 148 has an inverting (−) input, a noninverting (+) input coupled to a selected bias voltage and an output. An input resistor 152 is coupled to the output of amplifier 64 and the inverting input of amplifier 148 for application of the second signal developed by amplifier 64 to the amplifier 148. A feedback resistor 154 is coupled between the inverting input and the output of amplifier 148. The curve shaper amplifier 150 has an inverting (−) input, a noninverting (+) input electrically coupled to the output of the DC driver amplifier 148, and an output. At least one diode 156 has an anode coupled to the output of the curve shaper amplifier 150 and a cathode commonly connected to each of the inverting input of the curve shaper amplifier 150 and the second plate of the capacitor 140. A second diode 158 also has an anode coupled to the output of the curve shaper amplifier 150 and a cathode coupled to each of the inverting input of the curve shaper amplifier 150 and the second plate of the capacitor 140.

Switching means 138 includes a normally on transistor switch 160 electrically coupled between the second resistor 146 and the second plate of capacitor 140 and means 162 for turning off the transistor switch in response to the second signal exceeding a predetermined amplitude, such that the selected time duration become determined substantially by the first resistor 142. The transistor switch 160 in one embodiment of the present invention may be an N-channel depletion mode FET having a source coupled to the second plate of the capacitor 140, a drain coupled to the second resistor 146 and a gate. The turning off means 162 is responsive to the second signal for developing a gate voltage sufficient to turn the FET transistor switch 160 off when the second signal exceeds the predetermined amplitude.

The turning off means 162 includes a half-wave rectifier 164 and a coupling capacitor 166 to which the second signal is applied inverted by amplifier 148 from amplifier 64. The rectifier 164 develops the gate voltage for application to the gate of the transistor 160.

The rectifier 164 includes an amplifier 168, a feedback diode 170, an output diode 172 and a ripple smoothing capacitor 174. The amplifier 160 has an inverting (−) input to which the coupling capacitor 166 coupled to the output of amplifier 148 is coupled to. The noninverting input of amplifier 168 is coupled to ground potential. The feedback diode 170 has an anode coupled to the output of the amplifier 168 and its cathode coupled to its inverting input. The output diode has its cathode coupled to the output of amplifier 168 and its anode coupled to one plate of the ripple smoothing capacitor 174. The other plate of ripple smoothing capacitor 174 is coupled to ground potential. A resistor 176 is coupled in parallel with the ripple smoothing capacitor 174. Another resistor 178 couples the gate controlled voltage developed by rectifier 164 to the gate of the transistor switch 160.

Figure 13:
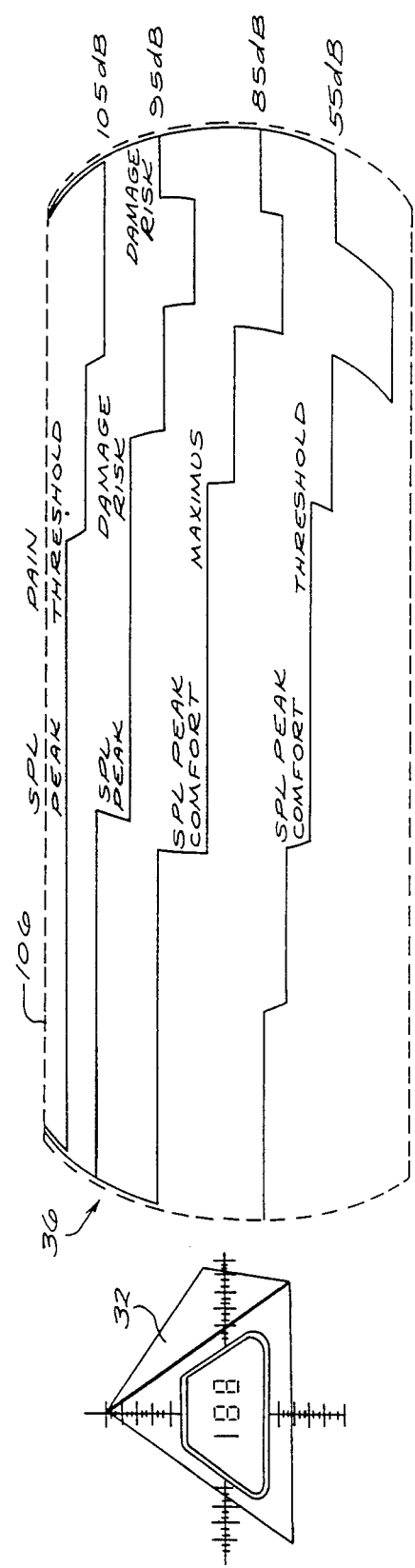
FIG. 13 schematically illustrates an overlay for the display of FIG. 12 which indicates potential damage to the ear.

Referring now to FIG. 13, there is shown one particular embodiment of the display overlay 36. The display overlay shows four district bands. These bands are sound pressure level (SPL), peak comfort threshold, SPL peak comfort maximus, SPL peak damage risk and SPL peak pain threshold levels. Each of these bands may be represented in the display by a different color. These colors overlay the LEDs 120. To indicate which of the active overlay colors is to be considered when viewing the LED bar graph display 106, there is further provided a plurality of indicator diodes 180 in the display panel component 30. These indicator diodes 180 are also seen in FIG. 7a. Each indicator diode emits a color corresponding to one of the overlay curves shown in FIG. 13.

Referring again to FIG. 7a, to illuminate each of the indicator diodes 180, the developing means 14 further develops a fourth signal, similar to the third signal used to drive the numeric character displaying means 32. The fourth signal is developed by a potentiometer 182 having one terminal coupled to the second plate of ripple smoothing capacitor 140, a second terminal coupled to ground potential and a third terminal at which the fourth signal is developed. The fourth signal is then applied to a rectifier 184. The rectifier then provides a rectified signal to an LED driver 186, similar to the LED drivers 122 described hereinabove. Depending on the level of the rectified signal, one of the indicator diodes 180 is illuminated.

The rectifier 184 includes an amplifier 188 having an input and an output and a diode 190 having a cathode coupled to the output of amplifier 188 and an anode. The rectifier 184 further includes a capacitor 192 coupled between the anode of the diode 190 and ground potential. It is from the capacitor 192 that the rectified signal is developed. Completing the description of the rectifier 184, a feedback resistor 194 is coupled between the input of the amplifier 188 and the anode of the rectifying diode 190. A potentiometer 196 may also be provided between the rectifier 184 and the LED driver 186.

Figure 6:
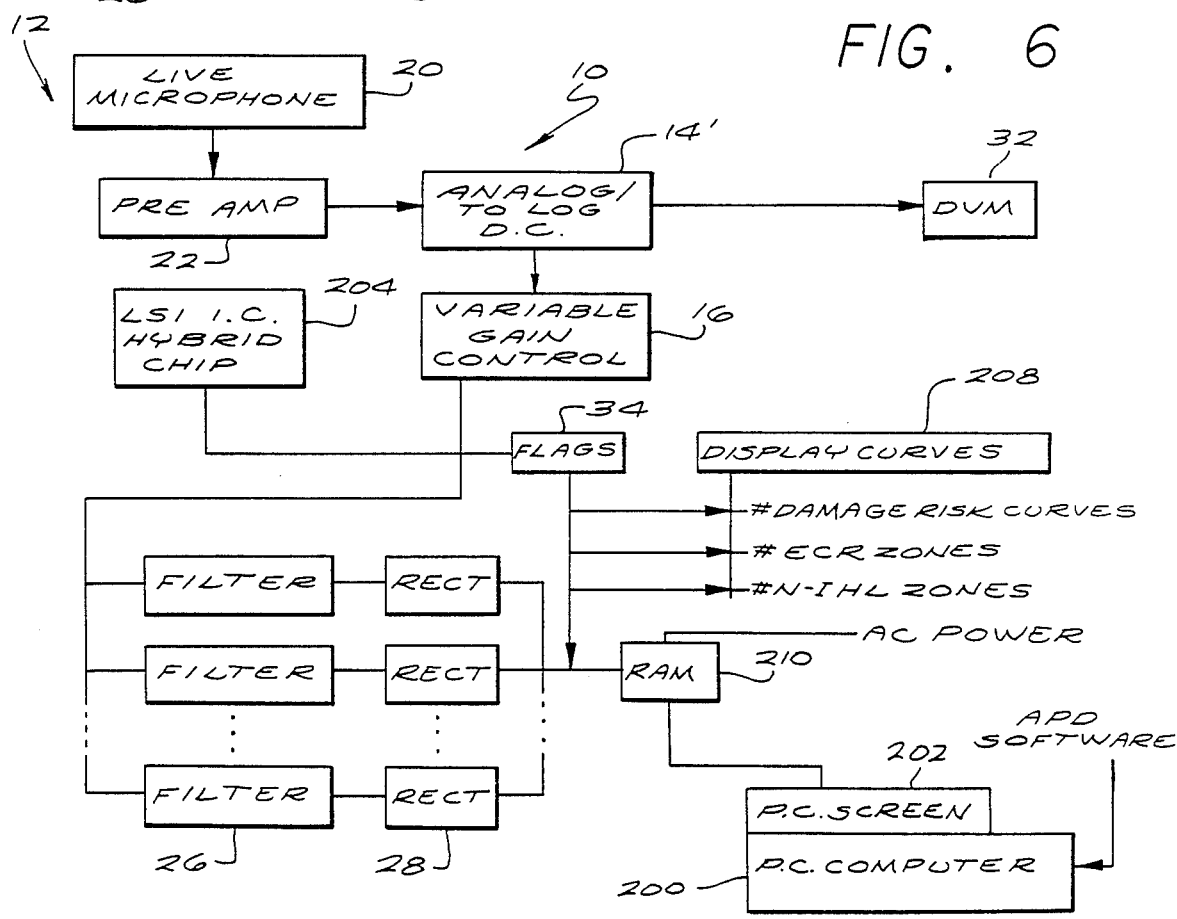
FIG. 6 is a schematic block diagram of an alternate embodiment of an audio analysis system constructed according to the principles of the present invention.
Figure 8:
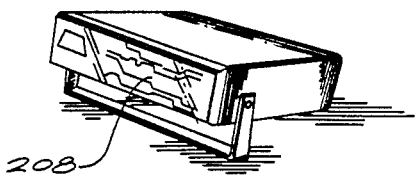
FIG. 8, FIG. 9, FIG. 10 and FIG. 11 successively illustrates video displays in a stand-alone, stereo rack, television and video display terminal applications, respectively, for the alternative embodiment of the present invention shown in FIG. 6.
Figure 9:
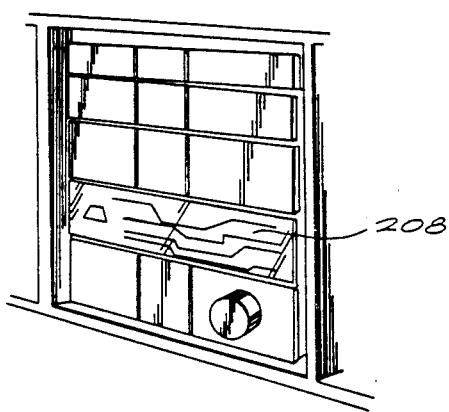
Figure 10:
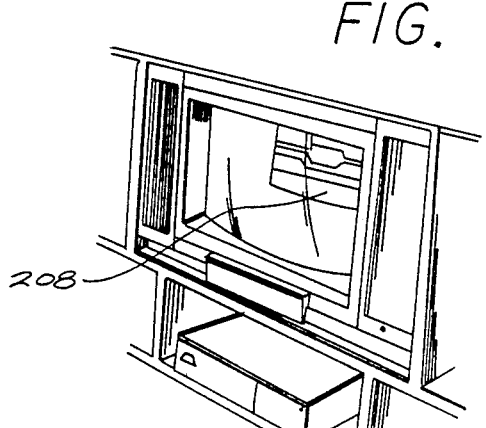
Figure 11:
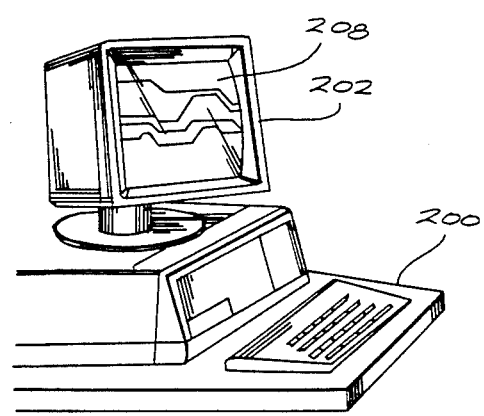

Referring now to FIG. 6, there is shown an alternative embodiment 10' of the audio analysis system described hereinabove. The alternative embodiment 10 prime of the audio analysis system is useful for generating a graphical display on a video display terminal. Referring to FIGS. 9-11, such examples of video display terminals are shown. FIG. 8 shows a stand-alone video display monitor and FIG. 9 shows a similar monitor used in a stereo rack configuration. In FIGS. 10 and 11, the audio analysis system may be shown on the CRT of a television as seen in FIG. 10, or of a computer system as shown in FIG. 11. The alternative embodiment 10' of the audio analysis system as described in FIG. 6 shows the PC computer 200 and PC screen 202 as used in FIG. 11.

The alternative embodiment 10' of the audio analysis system includes an LSI IC hybrid chip 204 which is designed to incorporate all the functions used to develop the third and fourth signals which are developed by developing means 14. Thus, the alternative embodiment 10' of the audio analysis system includes developing means 14' to indicate that some of the functions of the above-described developing means 14 are now incorporated in the hybrid chip 204.

In the alternative embodiment 10' of the audio analysis system, instead of generating display overlays 36 the similar overlays are developed as display curves 208 as indicated in FIGS. 8-11. The same flags 34 may be developed for generating the display curves 208. Furthermore, the flags are also used to generate the display in a bit mapped memory RAM 210. The bit mapped memory in the RAM 210 is then applied to the PC computer 200 for display on the screen 202.

Referring again to FIG. 7A and FIG. 12, an alternative overlay, in place of the overlay 36 shown in FIG. 13, is described. The alternative overlay includes a second LED 220 for each bar graph 106. The second LED 220, for purposes of description herein, will be described with reference to a bar graph 206 which is superimposed on bar graph 106. A rectifier circuit 224 is coupled between the plate of capacitor 140 which develops the third electrical signal described hereinabove and the bar graph 222. More particularly, the rectifier circuit 224 includes an amplifier 226 having an inverting input and a noninverting input coupled to ground, and an output. A diode 228 has a cathode coupled to the output of amplifier 226 and an anode. A feedback resistor 230 is coupled between the inverting input of amplifier 226 and the anode of diode 228. A capacitor 232 is also coupled between the anode of diode 228 and ground potential. To couple the signal from the capacitor 140 to the rectifier 224 a potentiometer 234 couples the capacitor 140 to the inverting input of the amplifier 226. To couple the rectified signal from the capacitor 232, a potentiometer 236 is electrically coupled between the capacitor 232 and the LED driver 238. The LED driver 238, as well as LED driver 122 described hereinabove, may be commercially available LM 3914 LED driver.

It has been noted above that in the circuit diagram of FIGS. 7A and 7B there are shown various biasing components not described herein. For the various components commercially available described herein, the connection and values of these bias components will be described in connection with said commercially available elements. The display driver 132 in one embodiment of the present invention would be an ADD3501CCN display driVer, the anode driver 134 is a DS75492N anode driver 30 is a TL075CN three digit LED. The bandpass filter 26 may be MF-8CCN IC filters.

There has been described hereinabove novel apparatus constructed in accordance with the principles of the present invention. Those skilled in the art may now make numerous uses of and departures from the description of the exemplary preferred embodiments set forth above without departing from the inventive concepts disclosed herein. Accordingly, the present invention is to be defined solely by the scope of the appended claims.

What is claimed is:

1. An audio analysis system comprising:
    means for detecting audible sound and converting said sound into a first electrical signal;
    means responsive to said first electrical signal for developing a second electrical signal as a function of an average DC level of said first signal;
    means responsive to said first electrical signal and said second electrical signal for shifting said average DC level of said first signal by an amount equal to the inverse of said second signal to develop a level shifted signal; and
    means responsive to said level shifted signal for visually displaying a variance of said level shifted signal in a plurality of discrete frequency bands from said second signal.

2. A system as set forth in claim 1 wherein said detecting means includes:
    a microphone; and
    a preamplifier operatively coupled to said microphone, said preamplifier developing said first signal.

3. A system as set forth in claim 2 wherein said microphone is a 130 dB omni-directional microphone.

4. A system as set forth in claim 2 wherein said preamplifier includes:
    an operational amplifier having an inverting input, a noninverting input and an output, said noninverting input being electrically coupled to said microphone;
    a first feedback resistor between said inverting input and said output and having a selected resistance;
    a second feedback resistor coupled between said noninverting input and ground potential and having a selected resistance; and
    an input calibration variable resistor coupled between said inverting input and ground potential.

5. A system as set forth in claim 4 wherein said preamplifier further includes:
    a first capacitor coupled between said inverting input and said output; and
    a second capacitor coupled between said input calibration resistor and ground potential.

6. A system as set forth in claim 4 wherein said resistance of said first resistor and said resistance of said second resistor are substantially equivalent.

7. A system as set forth in claim 1 wherein said developing means includes:

an analog to log DC converter having at least a signal input and a signal output, said signal input being adapted for application of said first signal thereto, said signal output developing said second signal, said second signal being a log DC signal of said first signal.

8. A system as set forth in claim 7 wherein said developing means further includes:
an amplifier having an inverting input, a noninverting input coupled to ground potential and an output adapted for applying said first signal to said signal input;
a feedback resistor electrically coupled between said inverting input and said output; and
an input resistor coupled to said inverting input and being adapted for application of said first signal thereto.

9. A system as set forth in claim 8 wherein said developing means further includes:
a first DC blocking capacitor electrically coupled between said output of said amplifier and said signal input of said analog to DC log converter;
a variable resistor to which said first signal is applied;
a second DC blocking capacitor electrically coupled between said variable resistor and said input resistor; and
a feedback capacitor electrically coupled between said inverting input and said output.

10. A system as set forth in claim 7 wherein said developing means further includes:
an amplifier having an inverting input, a noninverting input coupled to ground potential and an output, said inverting input being electrically coupled to said signal output, said output being adapted for applying said log DC signal to said shifting means; and
a feedback resistor electrically coupled between said inverting input and said output.

11. A system as set forth in claim 10 wherein said developing means further includes:
a capacitor electrically coupled between said inverting input and said output.

12. A system as set forth in claim 1 wherein said shifting means includes:
a voltage controlled amplifier having an inverting input, a noninverting input, an output, a first bias voltage input and a second bias voltage input, said first bias voltage input being coupled to a first bias potential, said second bias voltage input being adapted for application of said second electrical signal thereto, said output developing said level shifted signal;
a feedback resistor electrically coupled between said inverting input and said output; and
a first input resistor electrically coupled to said noninverting input and being adapted for application of said first electrical signal thereto.

13. A system as set forth in claim 12 wherein said shifting means further includes:
a DC blocking capacitor to which said first electrical signal is applied; and
a variable resistor electrically coupled between said DC blocking capacitor and said input resistor.

14. A system as set forth in claim 12 wherein said shifting means further includes:
a second amplifier having an inverting input, a noninverting input adapted for coupling to a second bias potential and an output electrically coupled to said second bias voltage input of said voltage controlled amplifier;
an input resistor to which said second signal is applied, said inverting input of said second amplifier being adapted for being coupled to said input resistor; and
a feedback resistor electrically coupled between each of said inverting input and said output of said second amplifier.

15. A system as set forth in claim 14 wherein said shifting means further includes a variable resistor electrically coupled between said input resistor and said inverting input of said second amplifier, said variable resistor being adjustable for tracking.

16. A system as set forth in claim 14 wherein said shifting means further includes a feedback capacitor electrically coupled between each of said inverting input and said output of said second amplifier.

17. A system as set forth in claim 12 wherein said third bias potential is adjustable for adjusting the gain of said voltage control amplifier, said third potential being coupled with said second potential.

18. A system as set forth in claim 12 wherein said shifting means further includes:
a potentiometer having a first terminal adapted for coupling to said first bias potential, a second terminal adapted for coupling to a third bias potential and a third terminal at which said second bias potential is developed, said third terminal being electrically coupled to said noninverting input of said second amplifier.

19. A system as set forth in claim 18 wherein said shifting means further includes:
a first voltage divider resistor electrically coupled between said first terminal and said first bias potential; and
a second voltage divider resistor electrically coupled between said second terminal and said third bias potential.

20. A system as set forth in claim 19 wherein each of said first voltage divider resistor and said second voltage divider resistor have a substantially identical resistance.

21. A system as set forth in claim 12 wherein said shifting means further includes:
an output amplifier having an input and an output adapted for applying said level shifted signal to said displaying means;
a second input resistor coupled to said input of said output amplifier and being adapted for application of said level shifted signal thereto; and
a feedback resistor coupled between said input and said output of said output amplifier.

22. A system as set forth in claim 21 wherein said shifting means further includes:
a first DC blocking capacitor electrically coupled between said output of said voltage controlled amplifier and said second input resistor; and
a second DC blocking capacitor electrically coupled to said output of said output amplifier to apply said level shifted signal to said displaying means.

23. A system as set forth in claim 1 wherein said displaying means includes:
a plurality of bandpass filters, each of said bandpass filters being associated with the respective one of said frequency bands, said level shifted signal being applied to each of said bandpass filters, each of said filters developing a filtered signal having an amplitude corresponding to intensity of said level shifted signal in said frequency band associated with each of said filters; and a plurality of LED bar graphs, each of said bar graphs being associated with a corresponding one of said filters for application of said filtered signal thereto, each of said bar graphs visually representing an amplitude of said filtered signal applied thereto.

24. A system as set forth in claim 23 wherein said displaying means further includes:

a plurality of driver amplifiers, each of said driver amplifiers being associated with one of said filters and having an inverting input, a noninverting input and an output adapted to apply said filtered signal to a corresponding one of said LED bar graphs, said noninverting input being adapted for application of said filtered signal from a corresponding one of said filters;

a plurality of bias resistors, each of said bias resistors being electrically coupled between said noninverting input of a corresponding one of said driver amplifiers and ground potential; and a plurality of feedback resistors, each of said feedback resistors being electrically coupled to said inverting input of a corresponding one of said driver amplifiers and adapted to be coupled to said output of said corresponding one of said driver amplifiers.

25. A system as set forth in claim 24 wherein said displaying means further includes:

a plurality of diodes, each of said diodes having an anode electrically coupled to said output of an associated one of said amplifiers and a cathode adapted for coupling to an associated one of said LED bar graphs, each of said feedback resistors being electrically coupled to said cathode of an associated one of said diodes, said diodes rectifying said filtered signal; and a plurality of capacitors, each of said capacitors being electrically coupled between said cathode of a corresponding one of said diode and ground potential to smooth said rectified filtered signal applied thereto.

26. A system as set forth in claim 24 wherein said displaying means further includes:

a plurality of DC blocking capacitors, each of said capacitors being electrically coupled between said noninverting input of a corresponding one of said driver amplifiers and a corresponding one of said filters.

27. A system as set forth in claim 24 wherein said displaying means further includes:

a plurality of variable resistors, each of said variable resistors being associated with a corresponding one of said bar graphs to adjust the level of said filtered signal applied thereto.

28. A system as set forth in claim 23 wherein each of said bar graphs includes:

a plurality of LEDs, one of said LEDs representing one bar in said bar graph; and an LED driver to which a filter signal is applied, said LED driver applying the current to selected ones of said LEDs as a function of said amplitude of said filtered signal applied to said driver.

29. A system as set forth in claim 28 wherein each bar of said bar graph represents a 2 dB change in amplitude of said filtered signal.

30. An audio analysis system is comprising:

means for detecting audible sound and converting said sound into a first electrical signal;

means responsive to said first electrical signal for developing a second electrical signal as a function of an average DC level of said first signal;

means responsive to said first electrical signal and said second electrical signal for shifting said average DC level of said first signal by an amount equal to the inverse of said second signal to develop a level shifted signal;

means responsive to said level shifted signal for visually displaying a variance of said level shifted signal in a plurality of discrete frequency bands from said second signal; and means for visually displaying in numeric characters said average level of said second electrical signal; said developing means further developing a third signal to which said numeric character displaying means is responsive.

31. A system as set forth in claim 30 wherein said numeric character displaying means includes:

an LED numeric display having a databus input and an anode to driver input;

a display driver having an input to which said third signal is applied, a databus output electrically coupled to said databus input and a controlled output; and an anode driver having a controlled input electrically coupled to said controlled output and a driver output electrically coupled to said anode driver input.

32. A system as set forth in claim 30 wherein said developing means further includes:

sample and hold means for storing for a selected time duration a peak voltage of said second signal, said third signal being said peak voltage and decaying during said selected time duration; and means for switching said selected time duration to a relatively longer time duration in response to large amplitude changes of said second signal.

33. A system as set forth in claim 32 wherein sample and hold means includes:

a storage capacitor having a first plate coupled to ground potential and a second plate;

means for coupling said second signal to said second plate to charge said capacitor to develop said third signal;

a first resistor electrically coupled between said second plate and ground potential; and a second resistor electrically coupled between said second plate and ground potential, said selected time duration being determined by an effective resistance of said first resistor and said second resistor being parallel coupled.

34. A system as set forth in claim 33 wherein said coupling means includes:

a DC driver amplifier having an inverting input, a noninverting input resistively coupled to a selected bias voltage and an output;

an input resistor coupled to said input and to which said second signal is applied;

a feedback resistor coupled between said inverting input and said output;

a curve shaper amplifier having an inverting input, a noninverting input electrically coupled to said output of said DC driver amplifier and an output; and at least one first diode having an anode copuler to said output of said curve shaper amplifier and a cathode commonly connected to each of said inverting input of said curved shaper amplifier and said second plate.

35. A system as set forth in claim 34 wherein said coupling means further includes:
a second diode having an anode coupled to said output of said curve shaper amplifier and a cathode coupled to said inverting input of said curve shaper amplifier.

36. A system as set forth in claim 32 wherein said switching means includes:
a normally on transistor switch electrically coupled between said second resistor and said second plate; and
means for turning off said transistor switch in response to said second signal exceeding a predetermined amplitude such that said selected time duration becomes determined substantially by said first resistor.

37. A system as set forth in claim 36 wherein said transistor switch is an n-channel depletion mode FET having a source coupled to said second plate, a drain coupled to said second resistor and a gate, said turning off means being responsive to said second signal for developing the gate voltage sufficient to turn said FET off when said second signal exceeds said pre-determined amplitude.

38. A system as set forth in claim 37 wherein said turning off means includes:
a half-wave rectifier; and
a coupling capacitor to which a second signal is applied, said capacitor further coupling said second signal to said rectifier, said rectifier developing said gate voltage, said gate voltage being coupled to said gate.

39. A system as set forth in claim 38 wherein said half-wave rectifier includes:
an amplifier having an inverting input, a noninverting input coupled to ground potential and an output, said coupling capacitor being coupled to said inverting input;
a feedback diode having an anode coupled to said inverting input and a cathode coupled to said output;
an output diode having an anode and a cathode coupled to said output;
a ripple smoothing capacitor coupled between said anode of said output capacitor and ground potential;
a first resistor coupled and paralleled with said ripple smoothing capacitor; and
a second resistor coupled between said anode of said output diode and said gate 40. An audio analysis system is comprising:
means for detecting audible sound and converting said sound into a first electrical signal;
means responsive to said first electrical signal for developing a second electrical signal as a function of an average DC level of said first signal;
means responsive to said first electrical signal and said second electrical signal for shifting said average DC level of said first signal by an amount equal to the inverse of said second signal to develop a level shifted signal;
means responsive to said level shifted signal for visually displaying a variance of said level shifted signal in a plurality of discrete frequency bands from said second signal; and
means for visually displaying an overlay with said variance of said level shifted signal, said overlay indicating the proximity of said average DC level in each of said frequency bands to a predetermined level.

* * * * *